US006820526B1

(12) United States Patent
Maddalon

(10) Patent No.: US 6,820,526 B1
(45) Date of Patent: Nov. 23, 2004

(54) AUTOMATIC DEVICE FOR FINISHING AND CUTTING MULTIPLE OR SINGLE IMAGES ON PAPER AND OTHER GRAPHIC AND PHOTOGRAPHIC SUBSTRATES IN REELS OR SINGLE SHEETS

(75) Inventor: Valter Maddalon, Pralungo (IT)

(73) Assignee: Fotoba International S.r.l., Quaregna (IT)

(*) Notice: Subject to any disclaimer, the term of this patent is extended or adjusted under 35 U.S.C. 154(b) by 0 days.

(21) Appl. No.: 09/298,726

(22) Filed: Apr. 23, 1999

(30) Foreign Application Priority Data

Apr. 23, 1998 (IT) ........................................ MI99U0289

(51) Int. Cl.7 .......................... B23Q 15/26; B26D 5/20; B26D 5/32; B26D 5/34; G03D 15/04

(52) U.S. Cl. ............................ 83/76.8; 83/210; 83/211; 83/364; 83/365; 83/368; 83/371; 83/948

(58) Field of Search ............................ 83/72, 74, 76.8, 83/364, 365, 367, 368, 948, 33, 34, 35, 36, 209, 210, 211, 360, 370, 371; 346/24

(56) References Cited

U.S. PATENT DOCUMENTS

| | | | | | |
|---|---|---|---|---|---|
| 3,133,466 | A | * | 5/1964 | Seifert | 83/211 |
| 3,199,450 | A | * | 8/1965 | Leavens | 83/371 X |
| 3,407,690 | A | * | 10/1968 | Stanley | 83/364 X |
| 3,443,867 | A | * | 5/1969 | Scheffel | 83/365 X |
| 3,559,519 | A | * | 2/1971 | Westphal et al. | 83/210 |
| 3,811,768 | A | * | 5/1974 | Zahn et al. | 83/365 X |
| 4,506,824 | A | | 3/1985 | Bartz | 234/28 |
| 4,541,317 | A | * | 9/1985 | Van Humbeeck et al. | 83/72 X |
| 4,697,485 | A | * | 10/1987 | Raney | 83/76.8 X |
| 4,721,058 | A | * | 1/1988 | Hayamizu et al. | 83/371 X |
| 4,784,318 | A | | 11/1988 | Bay | 234/2 |
| 4,839,674 | A | * | 6/1989 | Hanagata et al. | 346/136 |
| 4,971,304 | A | | 11/1990 | Lofthus | 271/227 |
| 5,028,040 | A | * | 7/1991 | Kalisiak | 270/52.08 |
| 5,079,981 | A | | 1/1992 | Singer et al. | 83/72 |
| 5,373,762 | A | * | 12/1994 | Kato | 83/371 X |
| 5,586,479 | A | | 12/1996 | Roy et al. | 83/74 |

FOREIGN PATENT DOCUMENTS

| | | | | |
|---|---|---|---|---|
| EP | 0 227 307 | * | 7/1987 | 83/371 |
| JP | 07-001022 | | 6/1995 | |

* cited by examiner

*Primary Examiner*—Clark F. Dexter
(74) *Attorney, Agent, or Firm*—Akin Gump Strauss Hauer & Feld, L.L.P.

(57) ABSTRACT

An automatic device for cutting paper and other graphic and photographic substrates in reels or single sheets through optical reflection recognition of complex marks includes at least a pair of rollers (2) for feeding the substrate, a motor (3) for driving said pair of rollers (2), a pair of optical sensors (4, 4') suitable to detect said marks and their angle with respect to the cutting line defined by a cutting assembly (7), a motor (5) for the relative alignment so as to cancel said angle, a motor (9) for driving the mobile blade of said cutting assembly (7), and a microprocessor suitable to process the signals from said optical sensors for controlling said motors (3, 5, 9).

6 Claims, 2 Drawing Sheets

Figure 1:
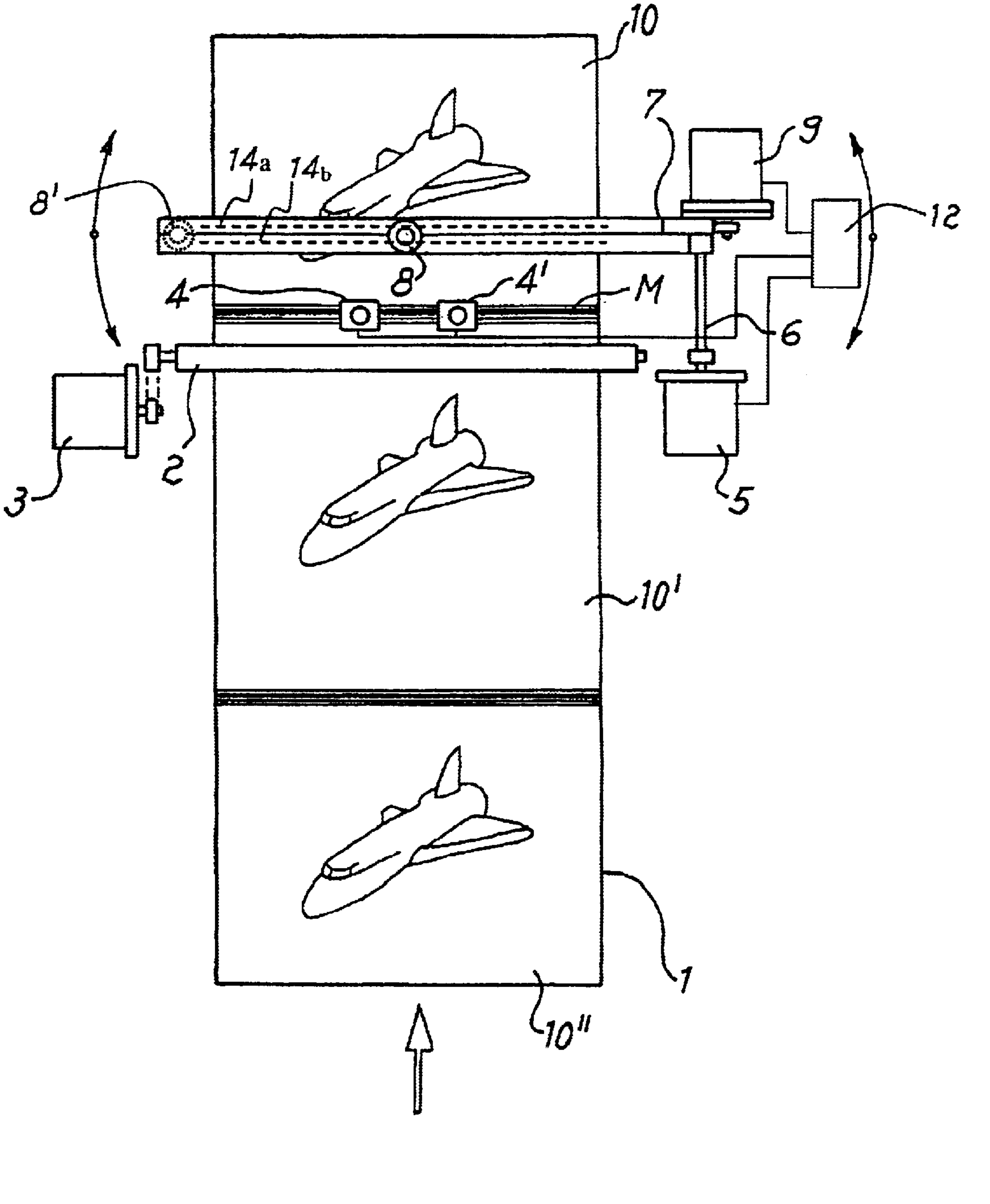

AUTOMATIC DEVICE FOR FINISHING AND CUTTING MULTIPLE OR SINGLE IMAGES ON PAPER AND OTHER GRAPHIC AND PHOTOGRAPHIC SUBSTRATES IN REELS OR SINGLE SHEETS

The present invention relates to the finishing and cutting of paper and other graphic and photographic substrates, and in particular to an automatic device which allows, in a quick and simple manner, the cutting, possibly at right angles, of said substrates printed by digital rendering systems.

It is known that the photographic technique is undergoing a deep transformation and the present tendency is to use digital printing systems for all those jobs previously made with conventional optical systems.

The systems which are presently available have the feature of printing at the same speed on substrates of different size, usually on reels which can reach a width of about 140 cm. In order to increase the productive capacity, given the unlimited possibility of paging of said systems, multiple copies of smaller size, arranged mutually parallel and perpendicularly to the longitudinal axis of the reel, are printed through a single exposure on the largest size allowed.

The print in different sizes and at different positions makes the known cutting systems unusable. The cutting operation is then usually carried out with manual means (cutters, etc.) or semiautomatic means which require of the operator the optical/manual alignment on the cutting line of the gap between the prints. This implies the need for continuous attention with a possibility of error and a significant waste of time, this drawback being so serious because the amount of time spent by the operator(s) to treat the material is greater.

Therefore there is a clear necessity for devising systems which relieve the operator of the manual performing of this delicate operation, by making it automatic and thus allowing for a quick, simple and precise way of carrying it out.

Among the attempts of solution provided in the prior art, the U.S. Pat. No. 5,586,479 discloses a device for cutting images printed on substrates in sheets not parallel to the sides of the substrates. This prior patent deals with the problem of defining the cut along the edge of the print even when there are no evident optical contrast between the substrate and the image by creating, though suitable software, small back marks upstream from the copy. The optical sensors are provided at the side of the substrate and thus the latter must be guided and the sensors' arrangement and position has to be changed at every change in the size, which is particularly disadvantageous when the substrate is made in single sheets.

Anyway, such an automatic cutting system was already used by the applicant since 1986 for paper reels and photocomposition film based on the optical reading of the edge and the creation of a mark. In order to prevent problems of reading errors and misinterpretation of the mark, also the parameter of its length to be measured for acceptance was used, in addition to other security means.

Also the U.S. Pat. No. 5,079,981 relates to an automatic cutting device, in particular for transparent substrates with automatic alignment of the blade on the substrate thanks to two sensors which detect at two different points the transparency/opacity threshold between substrate and image. The time lag between the two signals is converted by a processor into a number of pulses which are used to correct the cutting angle. However, this solution can only be used to trim and cut copies enclosed one by one into a transparent film, while it is clearly useless for separating copies within a larger size where the opacity is constant.

Therefore the object of the present invention is to provide an automatic cutting device, which possibly cuts at right angles, allowing to divide one by one the multiple copies in a quick and simple manner according to the positioning set by the system software during the printing step, without the drawbacks of prior art devices.

The main feature of the device according to the present invention is that it provides for complex linear optical marks being inserted between the copies or prints, where the cutting is required, which can be easily detected by continuous scanning so as to be cut or removed by means of a double cut parallel to the length of the mark. In this way, the cutting angle correction is carried out with respect to a mark and not to the edge of an opaque material laminated on a transparent material or of images printed not perpendicular to the substrate, which requires side guides. In fact, an important advantage of the present invention is that it can perform the cutting of substrates both in reels and in sheets, even without any guiding system.

Figure 2B:
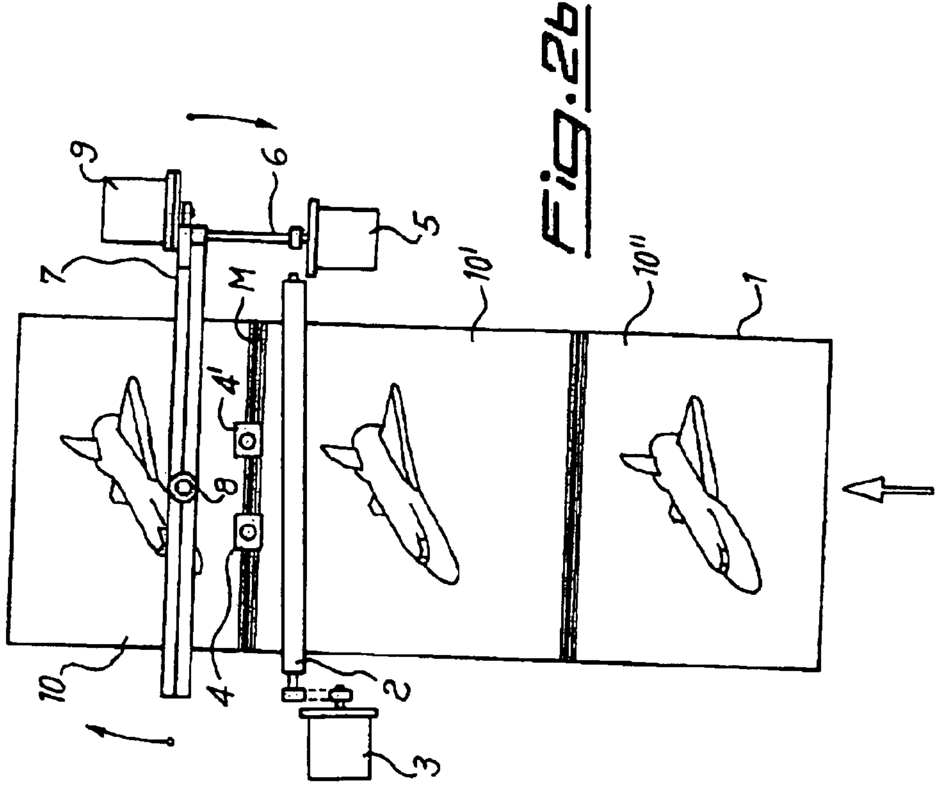
Figure 2A:
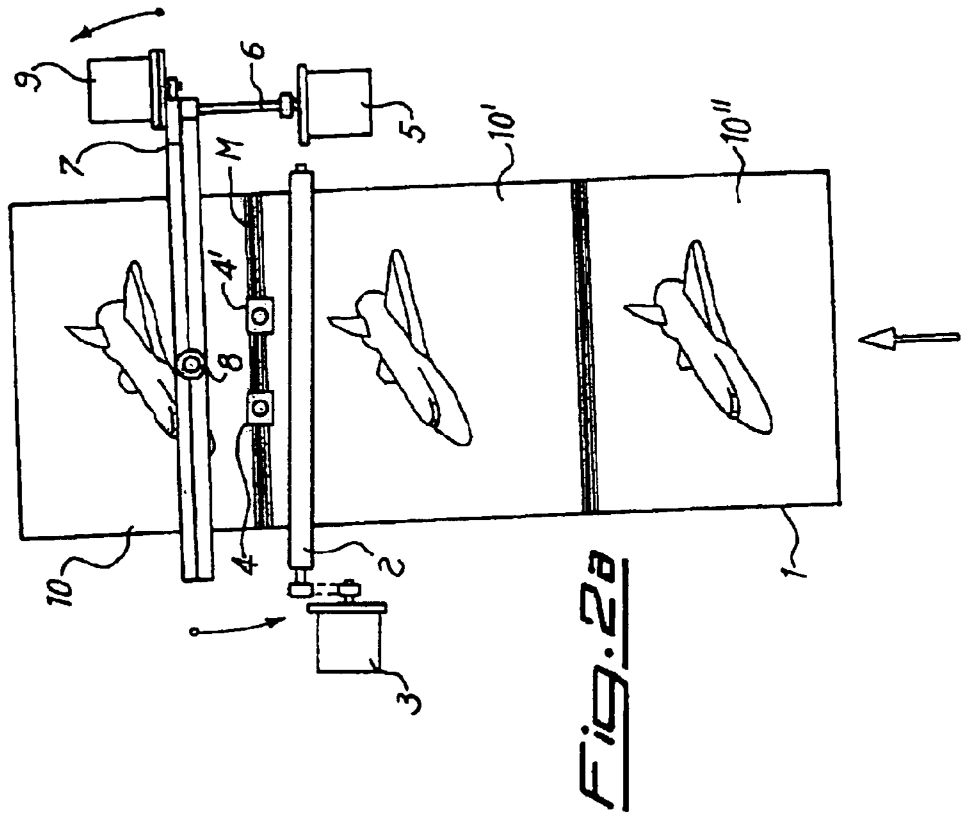

These and other advantages and characteristics of the device according to the present invention will be clear to those skilled in the art from the following detailed description of an embodiment thereof, with reference to the annexed drawings wherein:

FIG. 1 shows a diagrammatic top plan view of an automatic cutting device according to the present invention, during its normal operation;

FIGS. 2*a* and 2*b* show the device of FIG. 1 in operation, with the cutting assembly inclined at opposite angles with respect to the feed direction.

The device according to the present invention provides the automatic and motor-driven alignment of the cutting line to the mentioned marks according to the feed of a substrate 1 of multiple copies 10, 10', 10".

This automatic alignment is achieved by using as reference a boundary line M between the single copies, which can be identified by suitable reading systems. The line M includes a preset sequence of properly repeated black and white lines, which is previously stored in the memory of the device, and extends along the whole width of the image so that its presence can be detected even if the substrate 1 is without guides or references.

The following detailed description of an embodiment of the present invention refers to the cutting at right angles of photographic paper in a continuous strip or reel, but is obviously valid also for other graphic and photographic substrates.

The device according to the present invention provides at least a pair of rollers 2 for the feed of the paper strip 1, a first motor 3 for driving the rollers, a reading system consisting of two optical sensors 4, 4' for the optical reflection detection of the boundary line M between the copies, a mobile cutting assembly 7, a second motor 9 for driving the mobile cutting assembly, a third motor 5 for changing the orientation thereof with respect to the rollers 2 so as to make the mobile cutting assembly in alignment with the mark M, and a microprocessor 12 which processes the signal from the reading system and transmits it to the third motor 5.

With reference in particular to FIG. 1, there is seen a strip 1 of multiple copies 10, 10', 10" which is introduced into one end of the device according to the present invention and is fed by the only pair of rollers 2 illustrated in the figure (wherein only the upper roller is shown), which is driven in a known way by the motor 3, until it reaches the reading system which in the present embodiment consists of a pair of optical cells 4, 4'.

It should be noted that the substrate sheet 1 must meet only one condition, namely that it covers the area between the optical reading cells so that the mark M can be recognized by both sensors. The distance between the two sensors or cells 4, 4' is preferably equal to 1/10 of the substrate width, whereby a device suitable for a sheet of 82 cm of maximum width will have a distance between the cells of about 8 cm.

The differential reading of the two optical cells is transmitted to the microprocessor 12 which processes the signal and defines the shifting of the cutting assembly with respect to the edge of the copy, so as to achieve a perfect mutual alignment.

The microprocessor 12 drives, on the basis of the required shifting, the motor 5 (an angular motor in the present embodiment) which carries out the shifting and the subsequent correction of position of the cutting assembly 7 through a driving member 6 (which in the drawing is depicted as a worm screw engaging an end of the mobile cutting assembly 7 in any known way, e.g. a female screw integral therewith). The cutting assembly 7 is pivoted at 8 so that it can rotate as long as it is driven by the motor 5.

The angular displacement for the correction of the alignment is given by way of example in FIGS. 2*a* and 2*b*, wherein the cutting assembly takes two different and opposite positions with respect to the normal operation of FIG. 1, when the female screw of the driving assembly 6 is at the middle of the worm screw. This depends on a possible different inclination of the photographic paper entering the device according to the present invention or on the inclination of the edge of the copy with respect to the feed rollers 2 and the blade of the cutting device 7 arranged in a direction perpendicular to that of the correct paper feed.

It is clear that the cutting is quick, in that it is completely automatic, and perfectly at right angles, since the deviation from the position of correct alignment with the edge of the copy is exactly defined by the optical reading system and as much precisely calculated by the microprocessor 12 connected to the shifting motor system of the cutting assembly so as to cancel said deviation.

Once the cut has been carried out, a second pair of rollers downstream (if any, not shown in the drawings) takes away the copy cut by the device according to the present invention.

It should be noted that the rotation of the cutting assembly could be achieved in a different way, e.g. by providing its engagement with the adjusting motor at one end and its pivoting at 8', shown in phantom in FIG. 1, at the opposite end.

A device according to the present invention can also be easily provided wherein the orientation of the cutting assembly is fixed whereas the angle of the axis of the feed rollers is adjustable, for example under action of the so-called third motor 5 on the same feed rollers, the axes of which are pivotedly mounted, still in order to make the marking lines M in alignment with the blades 14*a* and 14*b* of the cutting assembly.

The fact that the alignment is carried out on the basis of the optical reading, the reading system, of the optical mark printed during the paging step at the edge of the copy or in the boundary area between the copies, allows to choose the reading system according to the optical marking system used during the paging step, thus making the device according to the present invention very versatile and adaptable to the most different needs.

In the past, the automatic cutting on the basis of the detection of a mark inserted between photographic images had always been avoided since the risks of error were considered too high. On the contrary, by using the simultaneous reading of two sensors, according to the invention, the recognition of the mark and the consent to the cutting are linked to as much as six different security levels, namely:

- the cutting mark consists of a precise white/black sequence stored in the microprocessor, which can recognize through scanning any type of mark with said features without any limit in size;
- during the scan, the device microprocessor stores the level of intensity of the white and black lines in order to create thresholds of acceptance and recognition;
- each line is also measured in thickness with a precision of 0.05 mm and is then compared with the corresponding stored size;
- the sum of the lines must correspond to the stored sum so as to prevent the tolerances, by adding up together, from causing errors;
- the mark M must be detected by both sensors in order to give the consent to the cutting;
- after the first alignment and cutting, the angular correction must be within an angle equivalent to the greatest drift which can be caused by the rollers 2 during the paper feed.

In particular, a bar code (consisting in this case of three-four lines of different thickness) allows for a very precise and clean separation of the copies, in that the cut is performed on the first and last line of this code (with the generation of a negligible waste) so that the cut copies do not bear any trace of the marking system, which would remain by using other systems.

The possibility that, despite the coincidence of all these conditions, an error occurs all the same is extremely unlikely.

Finally, with the device according to the present invention it is possible to divide and cut the copies present on a digitally printed substrate, in that the insertion of cutting marks to obtain a photocomposition with images (each one framed by said marks) printed so as to form a matrix with rows and columns is possible and easy only through a digital technique. In fact, once the scan is performed, the single copies can be divided by recognizing and cutting the marks first in one direction and then in the other direction, after having rotated the substrate through 90°.

What is claimed is:

1. A cutting system comprising a substrate including paper or other graphic or photographic substrate; and an automatic device for trimming and cutting, the substrate at right angles; (1) wherein the substrate has a series of images printed thereon, and wherein the substrate is marked by boundary marks (M) each boundary mark comprising a preset sequence of white and black lines extending along an edge of each of said images oriented at right angles to a feed direction of the substrate, each of the white and black lines having a size and an intensity; the automatic device comprising:

- at least a pair of rollers (2) for feeding the substrate in said feed direction;
- a first motor (3) driving the pair of rollers;
- a cutting assembly (7) spaced apart from the pair of rollers, the cutting assembly having a cutting width and cutting along said cutting width, said cutting width being transverse to said feed direction;
- a second motor (9) driving the cutting assembly to cut;
- a third motor (5) pivoting one of the cutting assembly and the pair of rollers to align said cutting assembly (7) and one of said boundary marks (M);

a reading system having first and second spaced apart optical sensors (4, 4') that detect one of the boundary marks (M) between the images, the second optical sensor spaced from the first optical sensor a distance that extends along and is equal to a fraction of the cutting width, wherein said distance extends along said one boundary mark that is being detected; and a microprocessor (12) in communication with said reading system and the second motor (9) and the third motor (5), the microprocessor having stored therein a stored intensity and a stored size respectively corresponding to the intensity and size of each of the white and black lines, the microprocessor (12) configured (i) to recognize the boundary marks (M) based on a detection of the boundary mark by both the first and second optical sensors and a comparison between the stored intensity and a detected intensity of each of the white and black lines, and (ii) to control the second and third motors (9, 5) based on recognition of the boundary marks (M).

2. The system according to claim 1, wherein said cutting assembly (7) has one end and an opposite end and is pivotally mounted at a pivoting point (8, 8') so as to rotate angularly under an action of said third motor (5) connected at the one end in order to get into alignment with one of said boundary marks (M), said pivoting point (8, 8') being provided at one of a central area of the cutting assembly and the opposite end.

3. The system according to claim 1, wherein the cutting assembly comprises first and second parallel spaced apart blades (14*a, b*), whereby one of the boundary marks (M) is completely removed by cutting adjacent a first line of the preset sequence with the first blade and adjacent a last line of the preset sequence with the second blade.

4. The system according to claim 1, wherein the microprocessor (12) is further configured to recognize the boundary marks (M) based on a comparison between the stored size of each of the white and black lines and a detected size of each of the white and black lines.

5. The system according to claim 4, wherein the microprocessor (12) is further configured to recognize the boundary marks (M) based on a comparison of a sum of the stored size of each of the white and black lines and a sum of the detected size of each of the white and black lines.

6. The system according to claim 5, wherein the microprocessor (12) is further configured to recognize the boundary marks (M) based on a determination that an angular correction for a second alignment and cutting with respect to a first alignment and cutting is less than a greatest drift which can be caused by the at least a pair of rollers (2) during a feed of the substrate.

* * * * *